United States Patent [19]

Tsuruta

[11] Patent Number: 4,470,079

[45] Date of Patent: Sep. 4, 1984

[54] TRACKING CONTROL SYSTEM IN A MAGNETIC RECORDING AND REPRODUCING APPARATUS

[75] Inventor: Masahiko Tsuruta, Yokohama, Japan

[73] Assignee: Victor Company of Japan, Ltd., Kanagawa, Japan

[21] Appl. No.: 347,395

[22] Filed: Feb. 10, 1982

[30] Foreign Application Priority Data

| Feb. 13, 1981 | [JP] | Japan | 56-19689 |
| Feb. 27, 1981 | [JP] | Japan | 56-27838 |
| Feb. 27, 1981 | [JP] | Japan | 56-27839 |
| Feb. 27, 1981 | [JP] | Japan | 56-27840 |
| Feb. 27, 1981 | [JP] | Japan | 56-27841 |
| Feb. 27, 1981 | [JP] | Japan | 56-27842 |
| Feb. 27, 1981 | [JP] | Japan | 56-27001[U] |

[51] Int. Cl.³ .................. H04N 5/783; G11B 21/10
[52] U.S. Cl. .................. 360/10.2; 360/10.3; 360/77
[58] Field of Search .................. 358/327, 310; 360/77, 360/10.1, 10.2, 10.3, 9.1, 70, 75

[56] References Cited

U.S. PATENT DOCUMENTS

| 4,143,405 | 3/1979 | Kubota | 360/10.2 |
| 4,148,083 | 4/1979 | Watanabe | 360/77 |
| 4,151,570 | 4/1979 | Ravizza et al. | 360/77 |
| 4,172,265 | 10/1979 | Sakamoto et al. | 360/70 |
| 4,197,564 | 4/1980 | Ravizza | 360/77 |
| 4,285,017 | 8/1981 | Arter et al. | 360/77 |
| 4,327,384 | 4/1982 | Tomita et al. | 360/77 |
| 4,402,022 | 8/1983 | Hirota et al. | 360/77 |

Primary Examiner—Donald E. McElheny, Jr.
Attorney, Agent, or Firm—Ladas & Parry

[57] ABSTRACT

A tracking control system in a magnetic recording and reproducing apparatus having one or a plurality of rotary heads for reproducing a signal by successively scanning oblique tracks on a magnetic tape, comprises a head moving mechanism for moving at least one rotary head along a direction of its height, a head moving signal applying circuit for generating a head moving signal in the form of a square wave which rises and falls for every 2nT (n is an integer, and T is a period in which one rotary head scans one track) period, when the rotary head scans the track with the same scanning pattern in units of 2nT period, to apply this head moving signal to the head moving mechanism, and a tracking control circuit for comparing a level of a reproduced signal at a position separated by a predetermined distance from an end part of the reproduced signal track by scanning the track in a state where the rotary head is moved to one side by the head moving mechanism, and a level of a reproduced signal at a position separated by the predetermined distance from an end part of the reproduced signal track by scanning the track in a state where the rotary head is moved to the other side by the head moving mechanism, to detect the tracking error, and obtaining a control signal from a detected output to apply the control signal to the head moving mechanism.

10 Claims, 26 Drawing Figures

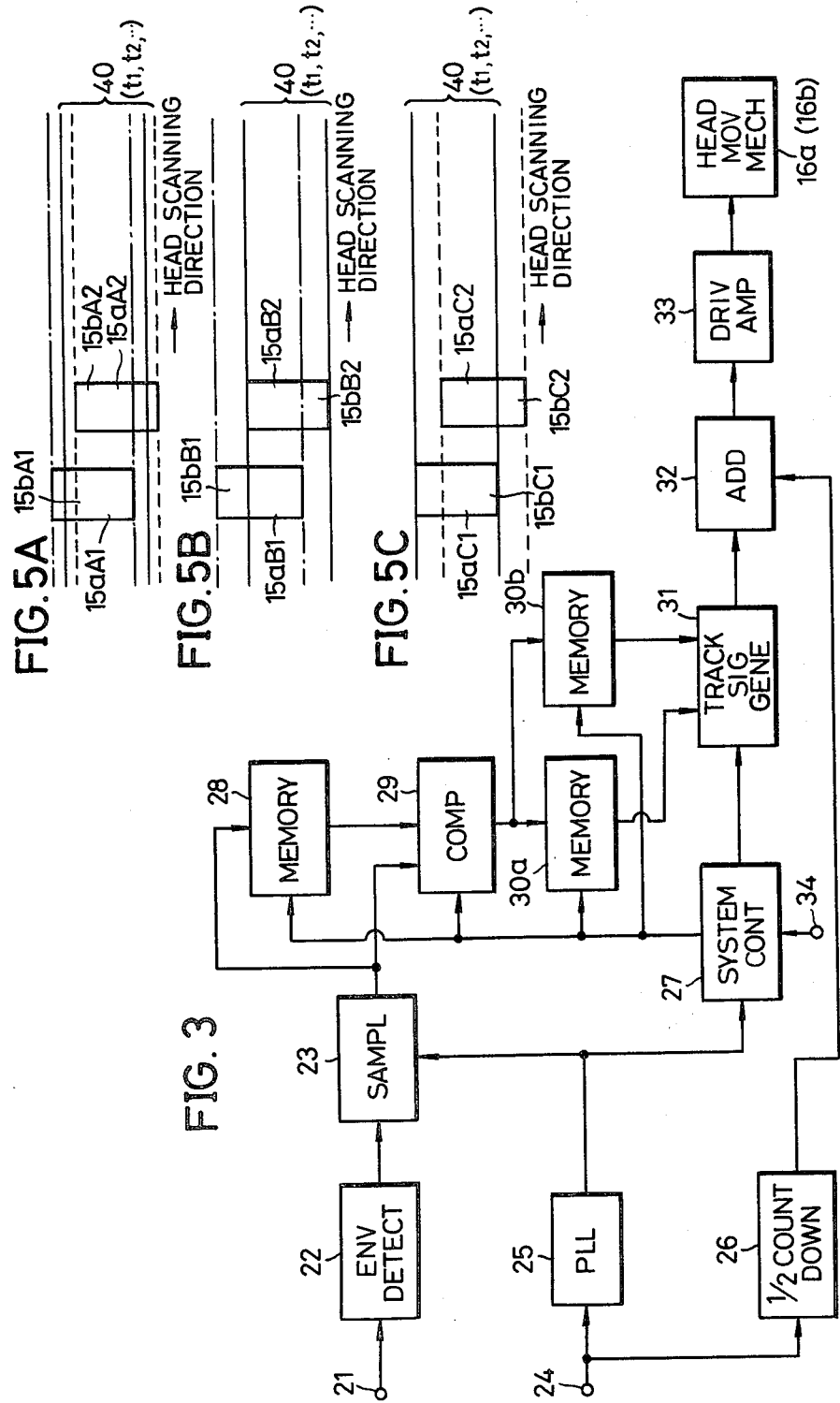

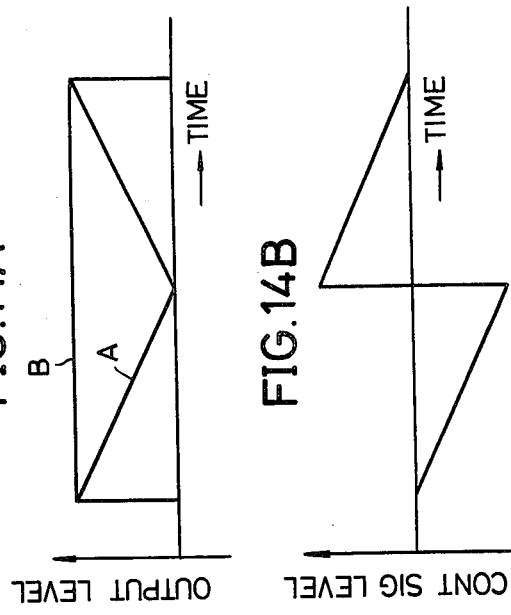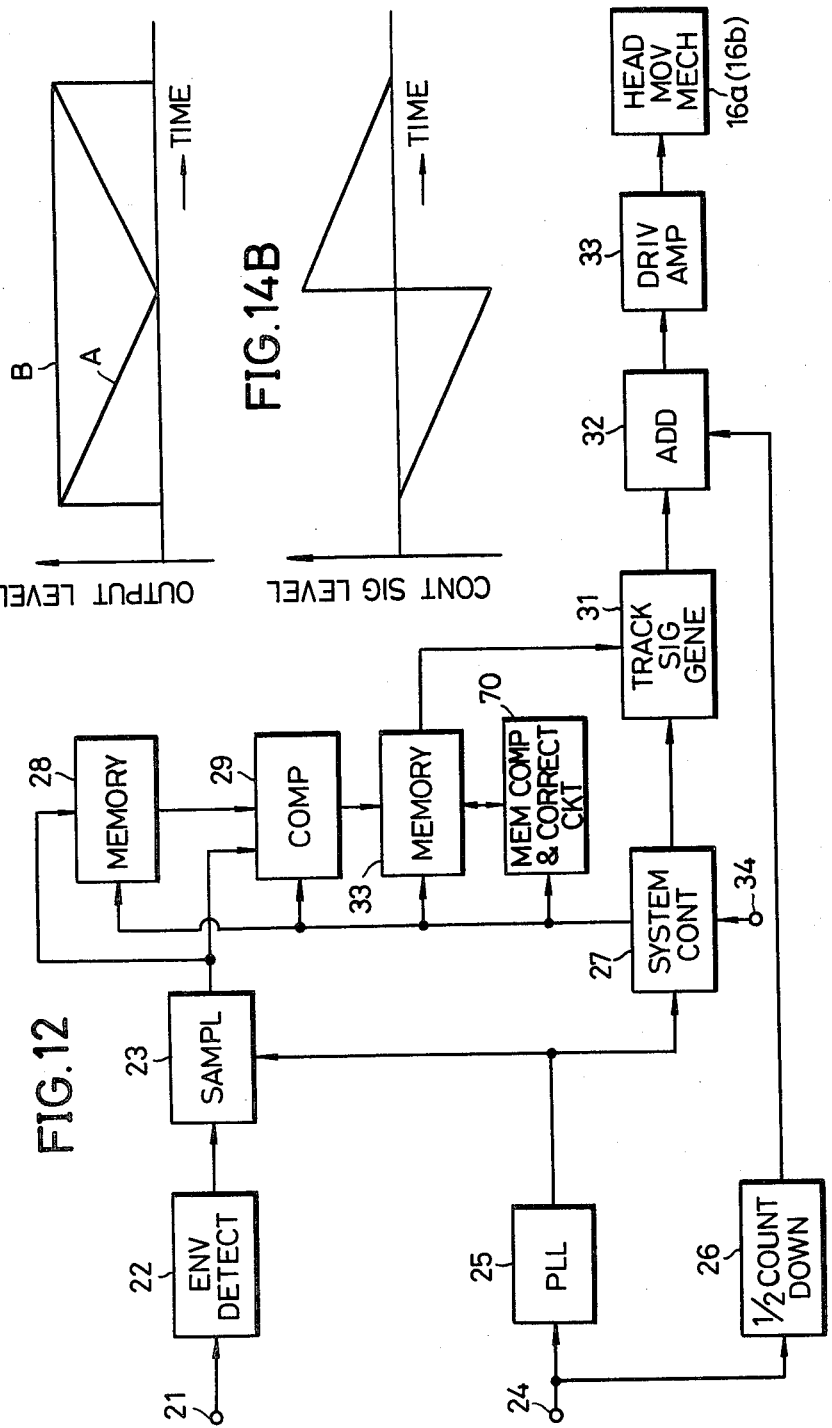

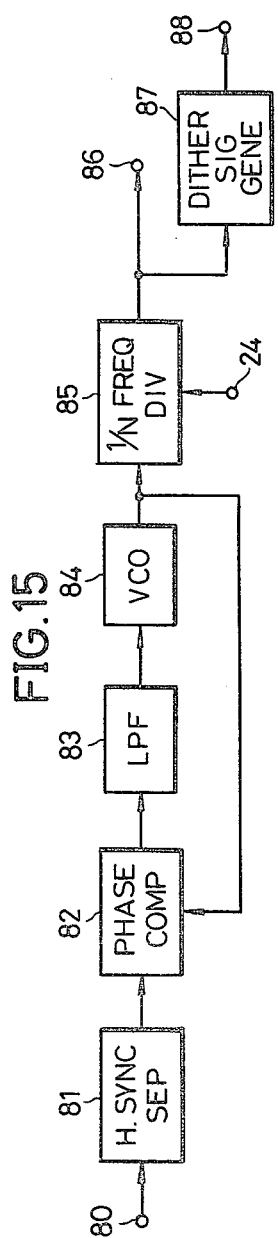
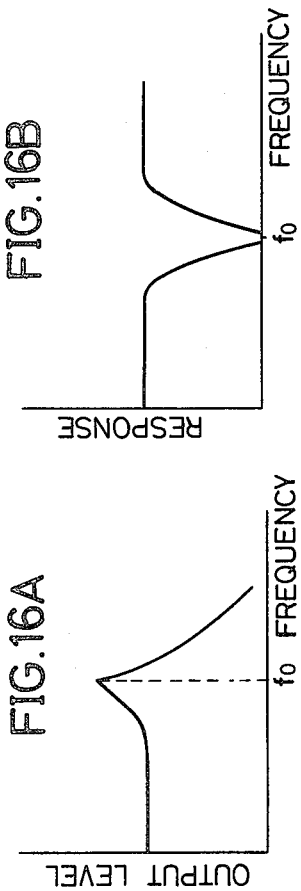
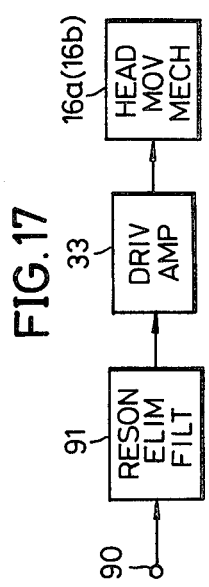

TRACKING CONTROL SYSTEM IN A MAGNETIC RECORDING AND REPRODUCING APPARATUS

BACKGROUND OF THE INVENTION

The present invention generally relates to tracking control systems in magnetic recording and reproducing apparatuses, and more particularly to a system for performing tracking control so that a most suitable tracking state is obtained by detecting the tracking error, in a magnetic recording and reproducing apparatus having a mechanism for swinging a rotary head which performs recording and reproduction with respect to a magnetic tape.

Conventionally, magnetic recording and/or reproducing apparatuses (hereinafter referred to as VTRs) which record and/or reproduce video signals on oblique tracks in a magnetic tape by use of rotary heads, have been in wide practical use. And recently, in order to extend the recording and reproducing time of the VTR for home use, apparatuses have been realized in which the tape travelling speed is reduced to one-third normal speed with respect to a cassette tape for performing two hours of normal recording and reproduction, for example, and using magnetic heads having narrow track widths, to perform six hours of recording and reproduction. In this case, the duration of the recording and reproduction is increased to three times that upon normal recording and reproduction. In the above type of VTR, some degradation is introduced in the signal-to-noise (S/N) ratio during the six-hour recording and reproduction compared to the normal two-hour recording and reproduction. However, the above six-hour recording and reproduction can be performed with sufficient S/N ratio for practical purposes.

When an extended-duration recording or reproduction is performed by reducing the track width, track pitch, and the like, the recording and reproducing operation is easily affected by tracking error as compared to the case of normal recording or reproduction in which the track width and the track pitch are large. Hence, during the above extended-duration recording and reproduction, it is essential that an accurate tracking operation is performed.

However, in reality, the size, angle, and the like of a mechanism in a tape moving system are not completely identical among different magnetic recording and/or reproducing apparatuses, and slight variations exist within the tape moving system. Inconsistency in the size and configuration of a tape guiding groove formed in a fixed guide drum, mounting height and mounting angle of a tape travel guide pole, mounting position and mounting angle of the fixed guide drum, and the like, are the main causes for the above variations introduced in the tape moving system. Accordingly, when a magnetic tape recorded by one VTR is reproduced by another VTR, bends are relatively introduced in the track on the magnetic tape with respect to the scanning loci of the rotary magnetic heads. When this kind of bends are introduced in the track on the magnetic tape, tracking error is introduced during scanning operations of the rotary magnetic heads. Furthermore, when inconsistency exists in each VTR with respect to the length of the magnetic tape along the tape travelling path, from a position where the rotary magnetic head begins to make contact with the magnetic tape to where a control head for recording and reproducing a control signal with respect to the magnetic tape is positioned, the above tracking error is also introduced. Reproduction cannot be performed with a fine S/N ratio when the above described tracking error exists.

Conventionally, as a system for correcting and controlling the above tracking error, there was a system in which a head moving mechanism is used to vary the height positions of the rotary magnetic heads by a control signal. In this system, a signal having a constant frequency of 480 Hz, for example, is applied to the head moving mechanism so that the heads swing with a small amplitude during each track scanning period. The quantity and direction of the tracking error are detected from the variation in the level of the reproduced signal. Hence, the control signal is obtained from the above detected result, and the control signal thus obtained is fed back to the head moving mechanism.

However, in the above conventional system, there was a disadvantage in that the level variation in the reproduced signal is large, since the heads swing several times during each track scanning operation of the heads. Moreover, when this system is applied to a so-called azimuth recording and/or reproducing apparatus in which recording and/or reproduction is performed by use of a pair of heads having gaps with azimuth angles in mutually opposite directions, color unevenness is introduced due to deviation introduced in the time base by the swinging of the heads, since the gaps in the heads form certain angles with respect to the swinging directions of the heads. In addition, the tracking error is constantly corrected during a scanning operation with respect to one track. Therefore, when the response of the above head moving mechanism is slow, the correction of the tracking error cannot be performed accurately, and in some cases, the tracking error is increased instead.

The bends in the track do not differ for each track, and the bends are commonly introduced in each of the adjacent tracks due to the various inconsistencies in the tape moving system among different recording and/or reproducing apparatuses. That is, a track bend identical to that existing at a part of the tape which is a certain distance from the edge of the tape with respect to one track, is introduced along the longitudinal direction of the tape for substantially the entire length of the tape, at parts which are the above certain distance from the edge of the tape.

Accordingly, a tracking control system was proposed in a U.S. patent application Ser. No. 225,006, now U.S. Pat. No. 4,402,022, filed on Jan. 14, 1981 entitled "TRACKING CONTROL SYSTEM IN A MAGNETIC REPRODUCING APPARATUS" in which the assignee is the same as that of the present application. This proposed tracking control system comprises head swinging means responsive to a sinusoidal wave head swinging voltage for varying the height position of the rotary magnetic head, and swinging the scanning position of the rotary magnetic head with respect to the track of the magnetic tape in the width direction of the track in a sinusoidal manner, one or a plurality of memory means for sampling and memorizing a voltage which is to be supplied to the head swinging means, at a point in time corresponding to when the rotary magnetic head passes one or a plurality of predetermined relative tracing positions with respect to the magnetic tape, level detecting means for detecting the level of a signal reproduced by the rotary magnetic head at a point in time identical to that of the above, maximum level detecting means for detecting whether the level detected by the level detecting means has reached a maximum, controlling means for enabling the read-out of the voltage memorized in the memory means upon detection of the maximum level by the maximum level detecting means, and adding means for adding the voltage read out from the memory means and the head swinging voltage supplied from the head swinging voltage generating means, and supplying the added voltage to the head swinging means.

However, in the above proposed system, the head swinging voltage is a sinusoidal wave, and the heads are swung so as to depict loci of sinusoidal forms. Hence, at the maximum and minimum points in the sinusoidal wave, the swinging deviation quantities of the heads with respect to a reference position become maximum, and the sensitivity of the tracking error detection becomes high. However, at intermediate parts of the sinusoidal wave between the maximum and minimum points, the swinging deviation quantities of the heads with respect to the reference position become small. Accordingly, there is a disadvantage in that the sensitivity of the tracking error detection becomes low. Moreover, there was a further disadvantage in that the sensitivity of the tracking error detection constantly varies due to the swnging of the heads.

Furthermore, there was a disadvantage in that color unevenness is introduced due to the displacement of the heads although the unevenness is not as significant as in the conventional system, since the heads constantly swing when the heads are scanning a track.

SUMMARY OF THE INVENTION

Accordingly, it is a general object of the present invention to provide a novel and useful tracking control system in a magnetic recording and reproducing apparatus in which the above described disadvantages have been overcome.

Another and more specific object of the present invention is to provide a system for performing tracking control in units of 2N (N is an integer) fields, when the track is scanned with the same pattern in units of tracks of N fields. According to the system of the present invention, accurate tracking control can be performed, and further, even during a changed-speed reproduction in which reproduction is performed by moving the tape at a speed different from the tape speed upon normal reproduction, fine tracking control can be performed as in the case of normal reproduction. Moreover, since a square wave voltage is used to swing the heads, the heads are swung in the form of a square wave. Thus, after the heads are swung and displaced, the heads are maintained at the same height positions until the heads are again moved and displaced. Therefore, the sensitivity of the tracking error detection does not vary and is always maintained at the maximum sensitivity. Further, deviation is not introduced in the time base, and color unevenness is accordingly not introduced.

Still another object of the present invention is to provide a tracking control system in which the tracking control signal is gradually produced from a point in time prior to the regular point in time when the tracking control is produced.

Another object of the present invention is to provide a tracking control system which does not perform comparison and control with respect to the tracking error, and controls the tracking in terms of predetermined quantities by detecting only the direction of the tracking error. According to the system of the present invention, an accurate tracking control can be performed without being affected by deviation in the reproduced signal level, noise, dropouts, and the like.

Still another object of the present invention is to provide a tracking control system constructed to stop the swinging (dither) of the heads after detecting the maximum reproduced signal level. According to the system of the present invention, the heads are maintained in the most suitable tracking state once the heads are put into this state, to enable fine reproduction.

Another object of the present invention is to provide a tracking control system which performs tracking control so that the heads can reproduce the same track throughout the entire length of the track even during a changed-speed reproduction mode. According to the system of the present invention, it is possible to obtain a reproduced signal having no noise even during the changed-speed reproduction mode, without the heads shifting or skipping the track.

Still another object of the present invention is to provide a tracking control system in which a sampling pulse is produced according to a synchronizing signal within a reproduced video signal, to detect the tracking error by use of this sampling signal. According the system of the present invention, it is possible to more accurately detect the tracking error to perform the tracking control.

Another object of the present invention is to provide a tracking control system capable of eliminating the resonance of the head moving mechanism, to finely perform the tracking control.

Other objects and further features of the present invention will be apparent from the following detailed description when read in conjunction with the accompanying drawings.

BRIEF DESCRIPTION OF THE DRAWINGS

FIG. 3 is a systematic block diagram showing a first embodiment of a tracking control system according to the present invention;

FIGS. 5A, 5B, and 5C respectively show states of tracking error in the system according to the present invention;

FIGS. 7A and 7B are graphs respectively showing waveforms of a sampling pulse and a tracking control signal, for explaining a second embodiment of a system according to the present invention.

FIG. 12 is a systematic block diagram showing a sixth embodiment of a system according to the present invention;

FIGS. 14A and 14B are graphs respectively showing the reproduced output signal level and the control signal level during the conventional changed-speed reproduction;

FIG. 15 is a systematic block diagram showing another embodiment of a pulse generating circuit part which is a part of the block system shown in FIG. 3, FIGS. 16A and 16B respectively show the resonance characteristic of a bimorph element constructing the head moving mechanism, and the frequency characteristic of a resonance elimination filter; and FIG. 17 is a systematic block diagram showing another embodiment of a circuit part which drives the head moving mechanism.

DETAILED DESCRIPTION

Figure 1:
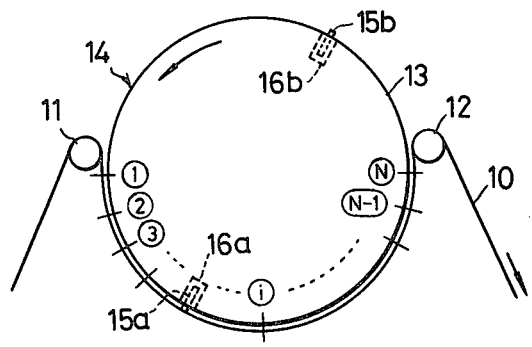
FIG. 1 shows the relationship between a rotary magnetic head and a magnetic tape travelling path, for explaining reproduced signal level detection points in a system according to the present invention.

In FIG. 1, a magnetic tape 10 is guided by guide poles 11 and 12, and obliquely guided with respect to a guide drum 14 consisting of a fixed drum (not shown) and a rotary drum 13, to travel in the direction of an arrow. The magnetic tape 10 travels in a state making contact with the guide drum 14 throughout a predetermined angular range (an angle slightly larger than 180 degrees) determined by the guide poles 11 and 12. A pair of rotary magnetic heads 15a and 15b are provided on the rotary drum 13 at positions mutually opposing each other along the diametrical direction. The rotary magnetic heads 15a and 15b are respectively supported by head moving mechanisms 16a and 16b.

As the above head moving mechanisms 16a and 16b, although not shown in the drawings, mechanisms of known construction can be used in which a known flexion type bimorph comprising a pair of piezoelectric ceramic plates having mutually different flexion direction bound together through a conductive flexible plate. One end of the bimorph is fixed and the other free end is mounted to the rotary head, to displace the head in a perpendicular direction with respect to the track longitudinal direction. The head is thus displaced by varying the height position of the head by use of the piezoelectric ceramic plate which expands at one end and contracts at the other end according to the polarity and value of the voltage applied thereto.

When the heads 15a and 15b pass positions ① through Ⓝ in FIG. 1, the level of the reproduced signal at each position is detected in a manner described hereinafter. The position ① is in the vicinity of the starting point where the scanning is started, and the position Ⓝ is in the vicinity of the terminal point where the scanning is terminated. The interval between the positions ① through Ⓝ is divided into N (N is an integer) equally spaced positions.

Figure 2:
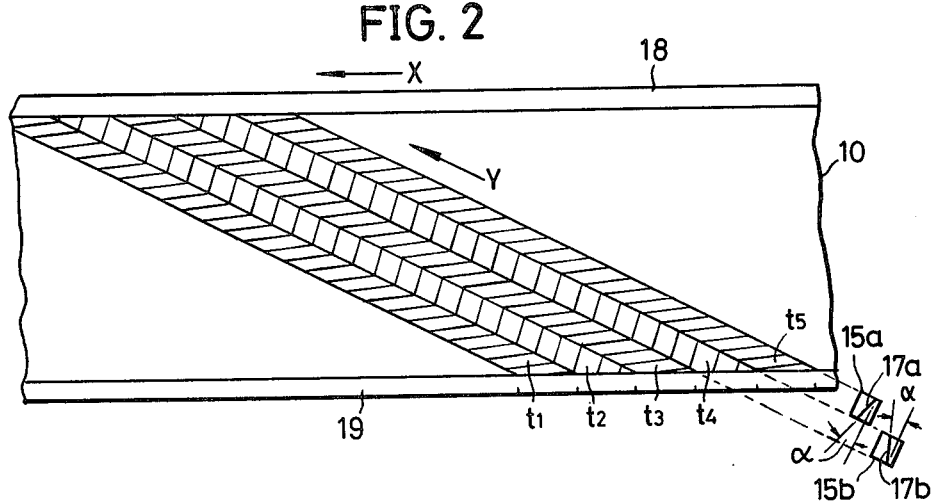
FIG. 2 shows the relationship between track patterns of the magnetic tape and the reproduced signal level detection points.

The heads 15a and 15b respectively have gaps 17a and 17b. These gaps 17a and 17b respectively have an azimuth angle α(six degrees, for example) in mutually opposite direction which is perpendicular to the scanning direction, as shown in FIG. 2. The tracks recorded and formed on the tape 10 travelling in the direction of an arrow X by the head 15a rotating in the direction of an arrow Y are designated by reference characters t1, t3, t5, . . . (wrhein the subscripts of t are odd numbers). The tracks recorded and formed by the video head 15b are designated by reference characters t2, t4, t6, . . . (wherein the subscripts of t are even numbers). The tracks t1, t2, t3, . . . are in contiguous contact without gaps or guard bands formed therebetween, whereby the tape utilization efficiency is high. Each track is recorded with a part of a video signal corresponding to substantially one field. A vertical synchronizing signal is positioned near an end part of the track. Although not shown, an audio signal and a control signal are recorded, respectively, at the upper and lower lateral edges of the tape 10, along tracks 18 and 19 in the longitudinal direction of the tape.

During normal reproduction, the magnetic tape 10 is moved so as to travel in the direction of the arrow X at the same speed as that upon recording. Thus, reproduction is performed in which the tracks t1, t3, t5, . . . are scanned by the head 15a and the tracks t2, t4, t6, . . . are scanned by the head 15b in an alternate manner. Accordingly, if the head 15a were to scan over the tracks t2, t4, . . . and the head 15b were to scan over the tracks t1, t3, . . . (that is, if a so-called "opposite tracking" were to be carried out), there would be almost no reproduction of signals because of the azimuth loss. Therefore, the rotational phases of the rotary heads are normally controlled by a control signal so that a track recorded by a head having a gap with a certain azimuth angle is scanned by a head having a gap of the same azimuth angle.

Next, description will be given with respect to a first embodiment of a tracking control system according to the present invention, by referring to FIG. 3.

A frequency-modulated video signal reproduced from each of the tracks t1, t2, . . . by the head 15a (15b), is supplied to a generally used demodulating circuit system, and also to an envelope detector 22 through an input terminal 21. Thus, the envelope of the frequency-modulated video signal is detected at the envelope detector 22. A detected output of the envelope detector 22 is supplied to a sampling circuit 23.

Figure 4A:
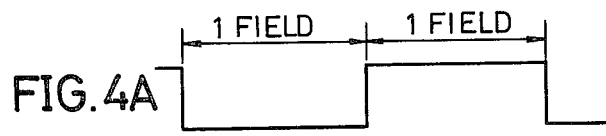
FIGS. 4A, 4B, and 4C are graphs respectively showing signal waveforms at each part of the block system shown in FIG. 3.
Figure 4B:
Figure 4C:
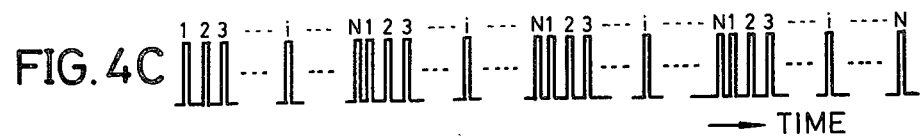

On the other hand, a drum pulse indicated in FIG. 4A detected according to the rotation of the rotary drum 13, is applied to a terminal 24. The drum pulse obtained from the terminal 24 is supplied to a phase-locked-loop (PLL) circuit 25 and to a ½-count-down circuit 26. The above drum pulse is a symmetrical square wave which rises and falls at every one-field interval. The PLL circuit 25 operates as a pulse generator, and is synchronized with respect to the rise and fall in the input drum pulse, to generate N (N is an integer) sampling pulses during one-field interval as indicated in FIG. 4C. The above sampling pulses are supplied to the sampling circuit 23 and to a system controller 27 consisting of a micro-computer. The points in time when each of the sampling pulses are generated, respectively correspond to the points in time when the head 15a (15b) scans over the positions ① through Ⓝ on the tape. Accordingly, the sampling circuit 23 samples the output of the envelope detector 22 by use of the sampling pulses obtained from the PLL circuit 25. Thus, the sampling circuit 23 obtains a signal in which levels of the signals reproduced by the head 15a (15b) at the positions ① through Ⓝ are sampled.

The frequency of the above input drum pulse is frequency-divided into one-half the original frequency, at the ½-count-down circuit 26. Hence, as indicated in FIG. 4B, the above input drum pulse is converted into a symmetrical square wave which rises and falls at every two-field (one-frame) interval. The output signal of the above ½-count-down circuit 26 is added with a control voltage which will be described hereinafter at an adder 32. Accordingly, the output of the adder 32 is applied to the head moving mechanism 16a (16b) as a head swinging or dither signal (hereinafter referred to as a dither signal), through a driving amplifier 33. Therefore, the head 15a (15b) is instantaneously changed over to positions higher and lower than a reference height position, for every two-field interval. That is, the head 15a (15b) is at a first position which is higher than the reference height position when the dither signal indicated in FIG.4B is of high level. On the other hand, the head 15a (15b) is at a second position which is lower than the reference height position when the dither signal is of low level. The amplitude of the above movement of the head is of a small value so as not to interfere with the normal reproducing operation.

Therefore, in a case where the scanning performed by the head 15a (15b) is normal and no tracking error exists, the head 15a scans slightly above a recording track 40 (t1) as indicated by 15aA1 in FIG. 5A, when the first field is reproduced. When the succeeding second field is reproduced, the head 15b scans slightly above the track 40 (t2) as indicated by 15bA1 in FIG. 5A. Moreover, when the third field is reproduced, the head 15a scans slightly below the recording track 40 (t3) as indicated by 15aA2. Similarly, the head 15b scans slightly below the recording track 40 (t4) as indicated by 15bA2, when the fourth field is reproduced. Thereafter, the above described operations are repeated.

When the heads 15a and 15b are shifted upwards, these heads depict scanning loci indicated in FIG. 5B. On the other hand, when the heads 15a and 15b are shifted downwards, these heads depict scanning loci indicated in FIG. 5C. In the above FIGS. 5B and 5C, 15aB1 and 15aC1 indicate the first field reproducing position of the head 15a, 15bB1 and 15bC1 indicate the second field reproducing position of the head 15b, 15aB2 and 15aC2 indicate the third field reproducing position of the head 15a, and 15bB2 and 15bC2 indicate the fourth reproducing field of the head 15b.

The values at the positions ①, ②, ..., Ⓝ of the head 15a with respect to the track t1 which are sampled at the above sampling circuit 23, for example, are supplied to a memory 28 and stored therein. Next, the values at the positions ①, ②, ..., Ⓝ of the head 15a with respect to the track t3, are supplied to the memory 28 and a comparator 29. The above memory 28 and the comparator 29 are controlled by a control signal having the same timing as the sampling pulse indicated in FIG. 4C which is obtained from the system controller 27. The values at the positions ①, ②, ..., Ⓝ with respect to the track t1 which are read-out from the memory 28, are supplied to the comparator 29 wherein these values are respectively compared with the values at the positions ①, ②, ..., N with respect to the track t3. The above comparing operation is performed so that the values at the same positions are compared. That is, the value at the position ① with respect to the track t1 is compared with the value at the position ① with respect to the track t3, the value at the position ② with respect to the track t1 is compared with the value at the position with respect to the track t3, ... A signal which is in accordance with the direction of the tracking error of the head 15a, can thus be obtained.

For example, upon normal reproduction, the output of the comparator 29 is stored in a memory 30a as a tracking error detection signal, and then supplied to a tracking control signal generating circuit 31. The signal thus supplied to the tracking control signal generating circuit 31 is converted into a tracking control signal according to each scanning position of the head 15a, for correcting the tracking error. This tracking control signal has a period of four fields. The above output tracking control signal is supplied to the adder 32 wherein the output tracking control signal is added with the above dither signal. The output of the adder 32 is supplied to the head moving mechanism 16a through the driving amplifier 33, to perform a tracking control operation with respect to the head 15a. Therefore, the head 15a is controlled so that the head accurately scans over the track even when bends exist in the track.

Although not shown in the drawings and description thereof is omitted, a system consisting of the above described memory, comparator, tracking control signal generating circuit, and the like are also provided with respect to the head 15b.

Figure 6:
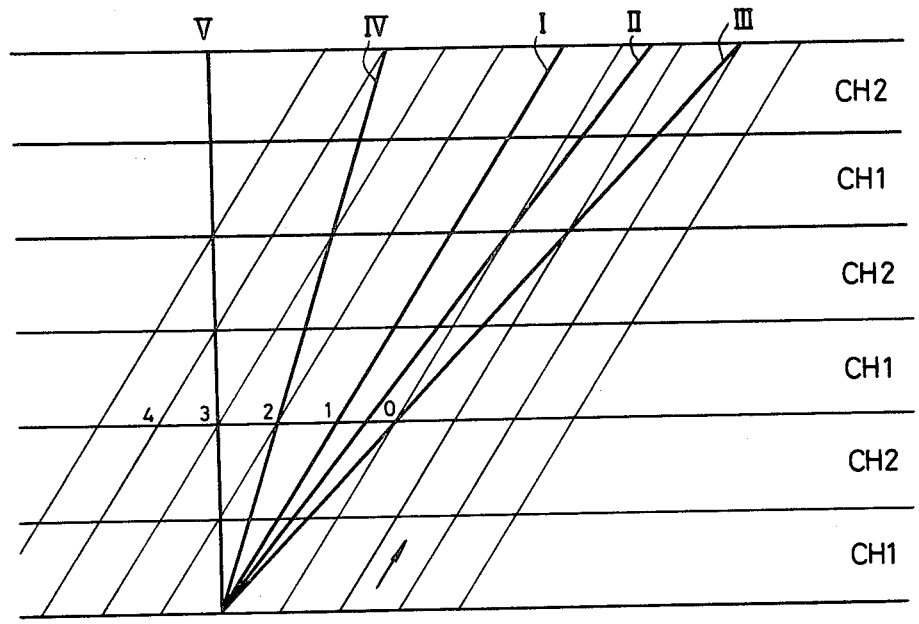
FIG. 6 shows scanning loci of rotary magnetic heads with respect to the track during each reproducing mode.

Scanning loci of the rotary magnetic heads with respect to the tracks during each reproducing mode, is indicated in FIG. 6. In FIG. 6, thin oblique and parallel lines indicate normal tracking loci when the heads 15a and 15b alternately and successively scan the tracks. In FIG. 6, an arrow indicates the scanning direction of the heads. Moreover, each of ranges indicated by CH1 represents one field scanning period of the first channel head 15a, and each of ranges indicated by CH2 represents one field scanning period of the second channel head 15b.

During a normal reproduction mode, the heads 15a and 15b constantly and alternately perform scanning in a regular tracking state, as indicated by a thick solid line I.

On the other hand, during a ½-speed slow-motion reproduction mode, for example, the heads 15a and 15b shift from the most suitable scanning state as the scanning progresses, as indicated by a thick solid line II. Thus, after a total of four fields are scanned and reproduced, the same scanning pattern is obtained again. Accordingly, in this case, the track is scanned with the same scanning pattern in units of tracks of four fields. A dither signal having a period of eight fields may therefore be used instead of the dither signal indicated in FIG. 4B having a period of four fields.

Similarly, during a still-picture reproduction mode, the scanning pattern of the heads 15a and 15b become as indicated by a thick solid line III in FIG. 6. In this case, the same scanning pattern is repeated with a unit of two fields. Hence, a dither signal having a period of four fields is used in this particular case.

In addition, during a double-speed quick-motion reproduction mode, for example, the same scanning pattern is repeated in units of two fields, as indicated by a thick solid line IV in FIG. 6. Thus, in this case, a dither signal having a period of four fields is used. It is the same for a triple-speed quick-motion reproduction mode, where the scanning pattern becomes as indicated by a thick solid line V.

In FIG. 3, a signal in accordance with a reproducing mode, is applied to the system controller 27 from a terminal 34. Accordingly, during normal reproduction, still-picture reproduction, double-speed quick-motion reproduction, and triple-speed quick-motion reproduction modes, the memory 30a is operated in the manner described above by the system controller 27. On the other hand, during the ½-speed slow-motion reproduction mode, the system controller 27 operates a memory 30b. The output of the comparator 29 is stored into the memory 30b as a tracking error detection signal, and then supplied to the tracking control signal generating circuit 31. A tracking control signal having a period of eight fields is obtained from the tracking control signal generating circuit 31.

Next, the speed of response of the tracking control mechanism is examined. When a large control signal for moving the heads is applied to the tracking control mechanism at a point in time when the head begins to make contact with the tape, the tracking control mechanism may not fully respond, or introduce a problem in which a mechanical resonance is generated. Accordingly, description will now be given with respect to a second embodiment of a system according to the present invention in which these problems have been eliminated.

The sampling pulse indicated in FIG. 4C is shown in an enlarged scale in FIG. 7A. The tracking control at an (i+1)th sampling position will be considered. Here, the i-th sampling pulse is applied to the sampling circuit 23, and during an interval in which the sampling pulse is of high level (H-level), the memory 28 reads-in the frequency-modulated (FM) reproduced output as data. On the other hand, at a point in time when the i-th sampling pulse becomes of low level (L-level), the system controller 27 instructs the tracking control signal generating circuit 31 to produce the (i+1)th tracking control voltage. The tracking control signal generating circuit 31 produces the tracking control signal, before the tracking control quantity is supplied to the circuit 31 from the memory 30a (30b) by the (i+1)th sampling pulse.

Assuming that the tracking control signal performs the tracking control at the (i+1)th signal, the tracking control signal has a waveform indicated in FIG. 7B in which the signal rises after the i-th sampling pulse terminates. Thus, the tracking control signal obtained has a waveform which rises after samplings immediately before each sampling terminate.

By using the tracking control signal having the above described waveform, the head moving mechanism constructing the tracking control mechanism gradually moves to a displaced position, before the (i+1)th sampling pulse is applied thereto.

Next, description will be given with respect to the operation between the point $Ⓝ$ where the rotary head substantially completes scanning over the tape, and a point where the rotary head makes a one-half revolution to make contact with the tape to start scanning. When the head 15a is at the position $Ⓝ$, for example, the other head 15b is at the position $①$. At this point, by the instruction from the system controller 27, the tracking control signal generating circuit 31 generates a tracking control signal which gradually increases in voltage during the interval in which the head 15a makes a one-half revolution to reach the position $①$. Accordingly, the head 15a is displaced during the interval in which the head 15a moves to the position $①$ from the position $Ⓝ$ without scanning the tape by making a one-half revolution. When the head 15a reaches the position $①$, the head 15a is already in the regular control position.

Therefore, in the present embodiment of the invention, the delay in the speed of response of the tracking control mechanism does not become a problem. Moreover, undesirable phenomenons such as the resonance of the head moving mechanism is not introduced.

When the reproduced FM signal from the heads 15a and 15b is observed, there is considerable deviation in the level of the reproduced FM signal, due to variations in the surface roughness on the magnetic side of the tape, dropouts, and the like. Hence, when the control is performed proportionally according to the level deviation in the reproduced FM signal, there are cases where no tracking control is obtained as a result.

Figure 8:
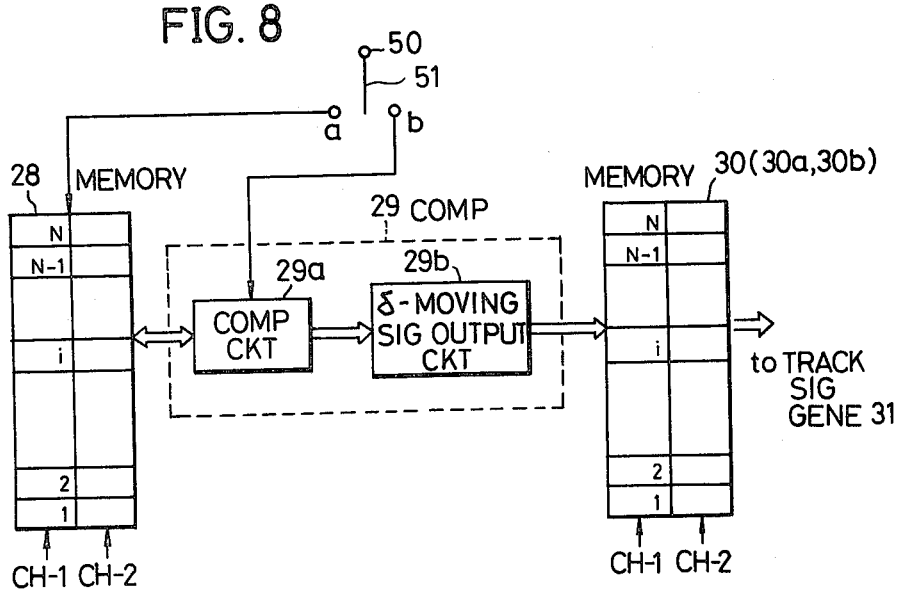
FIG. 8 is a systematic block diagram showing an essential part of a third embodiment of a system according to the present invention.

Accordingly, description will now be given with respect to a third embodiment of a system according to the present invention which has overcome the above described problems, by referring to FIG. 8. In FIG. 8, those parts which are the same as those corresponding parts in FIG. 3 are designated by the same reference numerals. In the present embodiment of the invention, when the tracking error exceeds a certain quantity, only the direction of the tracking error is detected, and the tracking control is performed in terms of predetermined quantities regardless of the tracking error quantity.

When the level of the reproduced signal from the sampling circuit 23 at the position $ⓘ$ corresponds to when the head is shifted upwards, a switch 51 becomes connected to the side of a contact point a by the instruction from the system controller 27. The data signal from the sampling circuit 23 obtained through a terminal 50 is supplied to the memory 28 according to the order of the sampling positions. For example, the data of the reproduced signal of the first field from the head 15a is supplied to the left side of the memory 28 shown in FIG. 8, and the data of the reproduced signal of the second field from the head 15b is supplied to the right side of the memory 28. Next, in a case where the data of the reproduced signal at the above position $ⓘ$ corresponds to when the head is shifted downwards, the switch 51 becomes connected to the side of a contact point b by the instruction from the system controller 27. Hence, in this case, the data signal from the sampling circuit 23 obtained through the terminal 50, is supplied to a comparing circuit 29a of the comparator 29. This comparing circuit 29a compares the data of the reproduced FM signal level from the memory 28 at the arbitrary position $ⓘ$ for the case where the head is shifted upwards, and the data of the reproduced FM signal level for the case where the head is shifted downwards, and supplies a compared output to a δ-moving signal output circuit 29b.

If, as a result of the comparison at the comparing circuit 29a, it is judged that the data obtained for the case where the head is shifted upwards and the data obtained for the case where the head is shifted downwards are the same, the δ-moving signal output circuit 29b sets the content of the memory 30 to ±0, indicating that there is no deviation. On the other hand, if the data of the reproduced FM signal level for the case where the head is shifted upwards is larger than the data of the reproduced FM signal level for the case where the head is shifted downwards, with the difference being over a predetermined quantity, as a result of the comparison at the comparing circuit 29a, for example, a constant deviation quantity +δ of a predetermined value is applied to the memory 30 regardless of the quantity of the above difference. Moreover, if the data of the reproduced FM signal level for the case where the head is shifted upwards is smaller than the data of the reproduced FM signal level for the case where the head is shifted downwards, with the difference being over a predetermind quantity, as a result of the above comparison, a constant deviation quantity $-\delta$ of a predetermined value is applied to the memory 30 regardless of the quantity of this difference.

As described above, according to the present embodiment of the invention, control is not performed proportionally according to the quantity of the above difference, but only the direction of the tracking error is detected to perform tracking control of a predetermined and constant quantity ($+\delta$ or $-\delta$). Accordingly, fine tracking control can be performed without being affected by the undesirable deviation in the reproduced FM signal level, dropouts, and the like.

Figure 9:
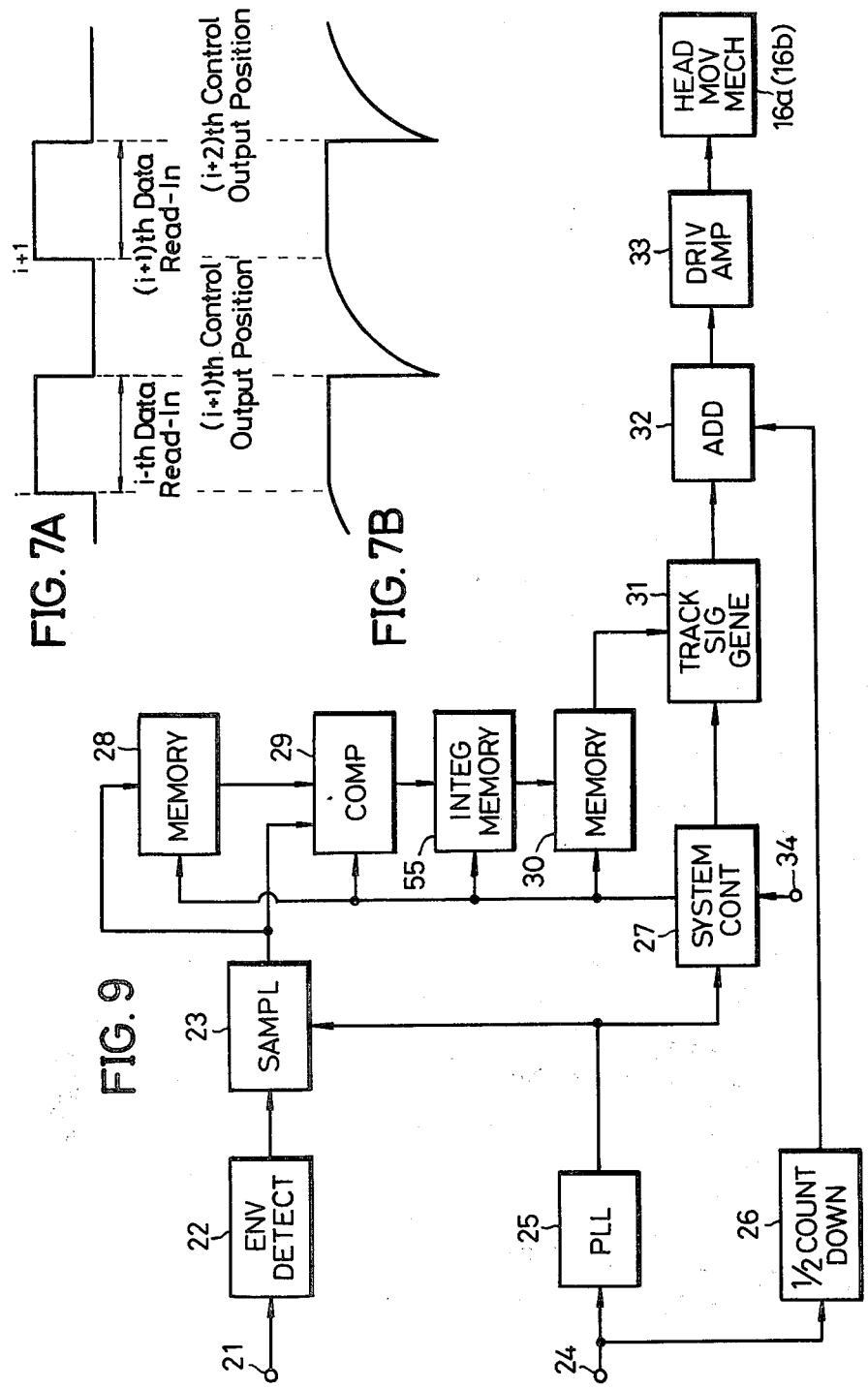
FIG. 9 is a systematic block diagram showing a fourth embodiment of a system according to the present invention.
Figure 10:
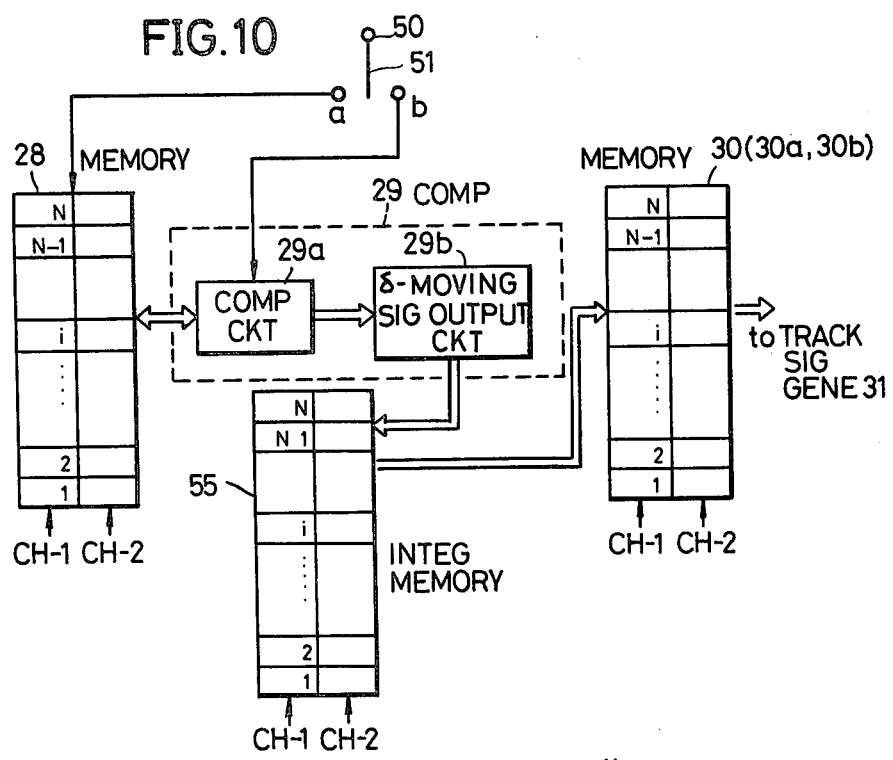
FIG. 10 is a systematic block diagram showing an essential part of the block system shown in FIG. 9.

Next, description will be given with respect to a fourth embodiment of a system according to the present invention, which is a development of the above third embodiment of the invention, by referring to FIGS. 9 and 10. In FIGS. 9 and 10, those parts which are the same as those corresponding parts in FIGS. 3 and 8 are designated by the same reference numerals, and their description will be omitted.

In the present embodiment of the invention, when the above difference is detected at the comparator 29, the output of the comparator 29 is supplied to an integrating memory 55. When the above memory 55 integrates the difference from the comparator 29 by a preset number of times (for example, two or three times), the deviation quantity $+\delta$ or $-\delta$ is applied to the memory 30.

According to the present embodiment of the invention, the tracking control is not performed immediately after the tracking error is detected once. Instead, the tracking control is performed for the first time after the tracking error is detected a plurality of times. Therefore, erroneous tracking control is prevented from being performed due to one erroneous detection of the tracking error, to enable a positive tracking control to be performed.

Figure 11:
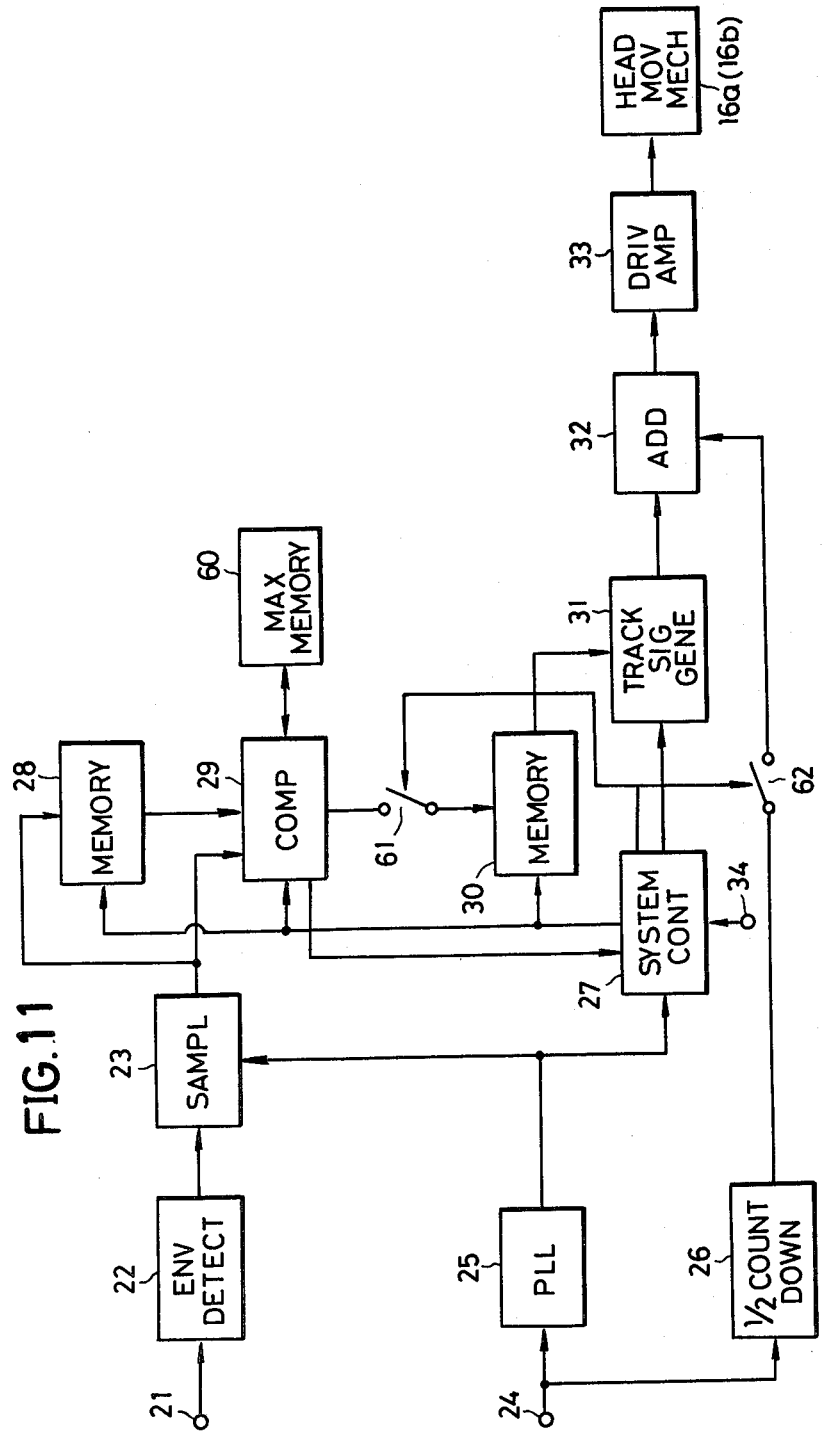
FIG. 11 is a systematic block diagram showing a fifth embodiment of a system according to the present invention.

The tracking control does not necessarily have to be performed constantly. After the tracking control is performed and the most suitable tracking state is obtained, the tracking control may be stopped as in a fifth embodiment of the present invention shown in FIG. 11 and described hereinafter. In FIG. 11, those parts which are the same as those corresponding parts in FIG. 3 are designated by the same reference numerals, and their description will be omitted.

In FIG. 11, the comparator 29 compares the magnitude of the input data and a data stored in a maximum value memory 60. If the input data is larger than the data stored in the memory 60, this input data is stored in the memory 60 instead of the previous data. Hence, the maximum value at each position of each channel is stored into the memory 60. This operation is performed for a predetermined interval.

The input data obtained from the sampling circuit 23 and the data at each positon of each channel from the memory 60 are compared at the comparator 29, and the system controller 27 opens switches 61 and 62 when both the data become equal. When the switch 61 opens, new signal is not supplied to the memory 30 thereafter. Hence, a tracking control signal which varies, is not produced from the tracking control signal generating circuit 31, and only a tracking information signal corresponding to the state where the above reproduced signal level becomes maximum is produced from the tracking control signal generating circuit 31. This tracking information signal is applied to the head moving mechanism 16a (16b). Furthermore, when the switch 62 opens, the dither signal from the $\frac{1}{2}$-count-down circuit 26 is interrupted. Thus, only the tracking information signal corresponding to the state where the above reproduced signal level becomes maximum is applied to the head moving mechanism 16a (16b), and the heads 15a and 15b are always maintained in the most suitable tracking state.

The comparator 29 compares the input data from the sampling circuit 23 and the data from the memory 60, and the above state is maintained when both data are identical. However, if the input data and the stored maximum data differ, the system controller closes the switches 61 and 62. Hence, in this case, the tracking control is performed until the most suitable tracking control is obtained again.

Next, description will be given with respect to an embodiment of the invention capable of performing fine changed-speed reproduction. When the speed of the tape travel is three times that upon normal reproduction, for example, in a state where the head moving mechanism is not operated and the head is fixed with respect to the drum, the head scans the tracks along the locus indicated by dotted lines in the direction of an arrow Y1. As the head scans from the track t1 and reaches the track t3 by scanning over the track t2, the reproduced output level varies as indicated by a connected line A in FIG. 14A. The output level becomes minimum (substantially zero) when the head scans over the full width of the track t2.

Figure 13A:
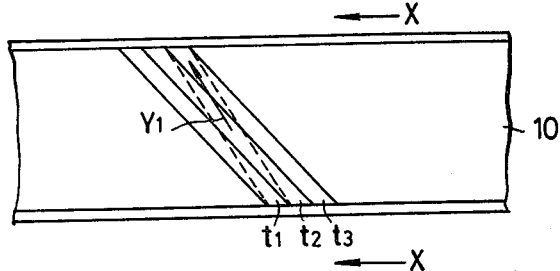
FIGS. 13A, 13B, and 13C respectively show track patterns, for explaining the scanning state of the heads over the track.
Figure 13B:
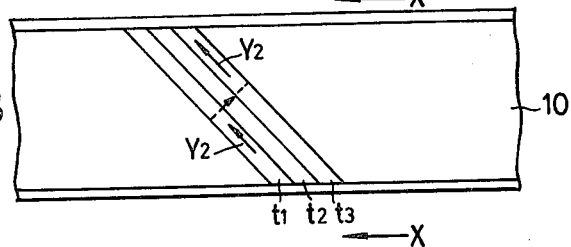

When a control signal having a waveform indicated in FIG. 14B is applied to the head moving mechanism, the head scans the front part of the track t1 as indicated by an arrow Y2 in FIG. 13B without introducing tracking error, and next, the head rapidly shifts to the track t3 to scan the rear part of the track t3 without introducing tracking error. Accordingly, the reproduced output level of the head should become substantially constant as indicated by a straight line B in FIG. 14A. However, in reality, the head moving mechanism cannot respond and operate so as to instantaneously shift the head from the track t1 to the track t3. Thus, noise is introduced in the reproduced signal as the head shifts to the track t3 from the track t1.

Figure 13C:
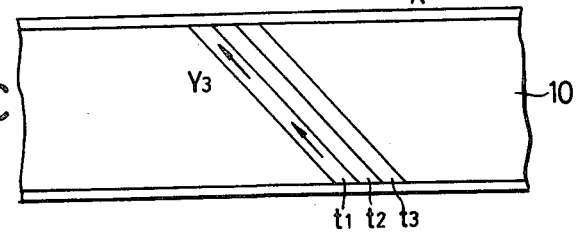

Therefore, in the present embodiment of the invention, measures are taken so that the head can scan the entire length of only the track t1 as indicated by an arrow Y3 in FIG. 13C, even during the quick-motion reproduction mode. Description of this embodiment of the invention will be described in conjunction with FIG. 12. In FIG. 12, those parts which are the same as those corresponding parts in FIG. 3 are designated by the same reference numerals, and their description will be omitted.

In FIG. 12, a memory comparing and correcting circuit 70 compares a reproduced signal level $M_i$ at the position $(i)$ and a reproduced signal level $M_{i-1}$ at the position $(i-1)$, varies the level $M_i$ so that $(M_i - M_{i-1})$ enters within a predetermined range between $\pm\delta$. Hence, by taking a measure so that $(M_i - M_{i-1})$ always assumes a value within the interval between $\pm\delta$, the head scans over a locus indicated by an arrow Y3 in FIG. 13C.

Furthermore, when the control is started from a point in time when the head is over a reverse track, the head may either move upwards or downwards to assume a tracking state. In this case, the order in which the heads 15a and 15b alternately scan the track may not become in an order t1, t2, t3, t4, t5, t6, ..., and there is a possibility that the order may become t2, t1, t4, t3, t6, t5, ... Accordingly, in the present embodiment of the invention, the memory comparing and correcting circuit 70 compares the reproduced signal levels of both the heads 15a and 15b, and performs control so that a difference does not exist between the two levels.

The reproduced signal level also varies also varies according to the width of the head which scans and reproduces, and the frequency of the reproduced signal. This is because the level of the reproduced signal varies according to the frequency characteristics of the amplifier, filter, and the like. The frequency of the frequency-modulated video signal sometimes vary by 1 MHz within one horizontal scanning period, and the reproduced signal output varies according to the sampling position.

An embodiment of the present invention which has overcome the above problems will be described in conjunction with FIG. 15. A circuit part within the block system shown in FIG. 15 is used instead of the PLL circuit 25 and the ½-count-down circuit 26.

A video signal obtained by demodulating an FM video signal which is reproduced by the heads, is supplied to a horizontal synchronizing signal separating circuit 81 through a terminal 81. The horizontal synchronizing signal separated at the horizontal synchronizing signal separating circuit 81 is supplied to a phase comparator 82. The phase comparator 82 compares phases of the separated horizontal synchronizing signal and an output of a voltage controlled oscillator (VCO) 84. An output of the phase comparator 82 is applied to the VCO 84 through a lowpass filter 83, to control the oscillation frequency of the VCO 84. The phase comparator 82, the lowpass filter 83, and the VCO 84 construct a phase locked loop (PLL). The output signal of the VCO 84 is supplied to a 1/N-frequency divider 85. The 1/N-frequency divider 85 is triggered by the drum pulse obtained from the terminal 24, and produces N sampling pulses indicated in FIG. 4C for every one-half revolution of the drum 13. These sampling pulses are supplied to the sampling circuit 23 through a terminal 86. Moreover, a dither signal generating circuit 87 counts the output pulse supplied from the 1/N-frequency dividing circuit 85. This dither signal generating circuit 87 generates a dither signal having a period of four fields as indicated in FIG. 4B, and supplies this dither signal to the adder 32 through a terminal 88.

According to the present embodiment of the invention, the sampling pulses are produced according to the horizontal synchronizing signal within the reproduced video signal. Thus, the tracking error can accurately be detected without being affected by the jitter, since the level of the reproduced FM signal is detected with respect to only specific frequencies. The signal for obtaining synchronism is not limited to the horizontal synchronizing signal within the reproduced video signal, and can be a periodical signal such as a color burst signal which facilitates the detection of the reproduced video signal.

For example, a flexion type bimorph element comprising a pair of piezoelectric ceramic plates having mutually different flexion direction bound together through a conductive flexible plate can be used as the head moving mechanisms 16a and 16b. However, the Q-factor of the mechanical resonance is high in this type of a bimorph element. Upon operation of such an bimorph element, a frequency characteristic indicated in FIG. 16A is obtained wherein a resonance point is at a frequency $f_o$. Hence, there is a disadvantage in this type of a bimorph element in that excessively large vibration is introduced at the frequency $f_o$.

Accordingly, in the present embodiment of the invention, a resonance eliminating filter 91 is provided between the adder 32 and the driving amplifier 33, as shown in FIG. 17. The output signal of the adder 32 is supplied to the driving amplifier 33 from a terminal 90, through the filter 91. The above filter 91 has a frequency characteristic having an attenuation pole at the frequency $f_o$ as indicated in FIG. 16B.

The output of the adder 32 is largely attenuated of the component having the frequency $f_o$, by being passed through the filter 91. Therefore, the bimorph element of the head moving mechanism which is applied with the output of the filter 91, can operate in a fine manner with a flat frequency characteristic without introducing mechanical resonance at the frequency $f_o$.

Further, the present invention is not limited to these embodiments, but various variations and modifications may be made without departing from the scope of the present invention.

What is claimed is:

1. A tracking control system in a magnetic recording and reproducing apparatus having one or a plurality of rotary heads for reproducing a signal by successively scanning oblique tracks on a magnetic tape, said tracking control system comprising:
    head moving means for moving at least one rotary head along a direction of its height;
    head moving signal applying means for generating a head moving signal in the form of a square wave which rises and falls for every 2nT (n is an integer, and T is a period in which one rotary head scans one track) period, when the rotary head scans the track with the same scanning pattern in units of 2nT period, to apply this head moving signal to said head moving means; and
    tracking control means for comparing a level of a reproduced signal at a position separated by a predetermined distance from an end part of the reproduced signal track by scanning the track in a state where the rotary head is moved to one side by said head moving means, and a level of a reproduced signal at a position separated by said predetermined distance from an end part of the reproduced signal track by scanning the track in a state where the rotary head is moved to the other side by said head moving means, to detect the tracking error, and obtaining a control signal from a detected output to apply the control signal to said head moving means.

2. A tracking control system as claimed in claim 1 in which said tracking control means performs sampling at each position obtained by equivalently dividing each track into N (N is an integer equal to or greater than 2) parts to detect the tracking error, and when performing the tracking control by obtaining a control signal according to the detected output at an (i+1)th (i is an integer) sampling position, said tracking control means produces a tracking control signal having a waveform which rises after the sampling is completed at an i-th sampling position.

3. A tracking control system as claimed in claim 2 in which the signal reproduced from said magnetic tape is a video signal, and said tracking control means produces a sampling signal in synchronism with a periodical signal separated from a reproduced video signal, to detect the tracking error by use of said sampling signal.

4. A tracking control system as claimed in claim 1 in which said recording and reproducing apparatus comprises a plurality of rotary heads, each of said rotary heads having a period in which the rotary head scans and reproduces the magnetic tape and a period in which the rotary head does not scan the magnetic tape within one revolution of the rotary head, and said tracking control means produces a tracking control signal having a waveform which rises during the period in which each rotary head does not scan the magnetic tape.

5. A tracking control system as claimed in claim 1 in which said tracking control means detects the direction of the tracking error and produces a tracking control signal for moving the rotary head by $+\delta$ or $-\delta$ ($\delta$ is a predetermined quantity) according to the direction of the tracking error.

6. A tracking control system as claimed in claim 5 in which said tracking control means produces said tracking control signal upon detection of tracking error in the same direction a plurality of times.

7. A tracking control system as claimed in claim 1 which further comprises interrupting means for interrupting the application of said head moving signal to said head moving means, said tracking control means interrupting the application of said head moving signal by said interrupting means upon detection of a maximum reproduced signal level of the rotary head.

8. A tracking control system as claimed in claim 7 in which said tracking control means interrupts the application of said tracking control signal to said head moving means and only applies an information signal to said head moving means so that the rotary head is maintained at a position where the maximum reproduced signal level can be maintained, upon detection of said maximum reproduced signal level.

9. A tracking control system as claimed in claim 1 in which said tracking control means produces a control signal so that each rotary head respectively scan one track along the entire length of the track, when said recording and reproducing apparatus performs changed-speed reproduction by moving the magnetic tape at a speed different from the tape speed upon normal reproduction.

10. A tracking control signal as claimed in claim 1 in which said head moving means comprises a head moving element having a mechanical resonance point at a certain frequency $f_o$, and said tracking control means further comprises a filter having an attenuation pole at said frequency $f_o$, said filter being supplied with the signal which is to be supplied to said head moving means and attenuating a component having said frequency $f_o$.

* * * * *